United States Patent [19]

Nishimura

[11] Patent Number: 4,843,694
[45] Date of Patent: Jul. 4, 1989

[54] METHOD OF MAKING A CLUTCH ROTOR FOR AN ELECTROMAGNETIC CLUTCH

[75] Inventor: Kazuo Nishimura, Isesaki, Japan

[73] Assignee: Sanden Corporation, Japan

[21] Appl. No.: 203,110

[22] Filed: Jun. 7, 1988

Related U.S. Application Data

[62] Division of Ser. No. 71,195, Jul. 7, 1987, Pat. No. 4,789,380.

[30] Foreign Application Priority Data

Jul. 8, 1986 [JP] Japan .................. 61-158681

[51] Int. Cl.⁴ .................................. R21K 1/42
[52] U.S. Cl. ........................ 29/159 R; 29/508
[58] Field of Search ............ 29/159 R, 508; 474/166, 474/168, 170, 174, 177; 72/367, 84, 68

[56] References Cited

U.S. PATENT DOCUMENTS

| | | | |
|---|---|---|---|
| 1,266,579 | 5/1918 | Garcelon | 474/168 |
| 1,903,776 | 4/1933 | Clark et al. | 29/159 R |
| 2,198,831 | 4/1940 | Moyer | 474/177 |
| 3,245,273 | 4/1966 | Loper et al. | 29/159 R |
| 4,004,335 | 1/1977 | Pierce et al. | 29/159 R |
| 4,109,542 | 8/1978 | Kraft | 474/174 |
| 4,129,026 | 12/1987 | Pierce et al. | 72/367 |
| 4,236,289 | 12/1980 | Oldford | 29/159 R |
| 4,287,976 | 9/1981 | Sakaki et al. | 474/170 |
| 4,292,723 | 10/1981 | Rauscher | 29/159 R |

FOREIGN PATENT DOCUMENTS

| | | |
|---|---|---|
| 1287490 | 6/1970 | United Kingdom . |
| 1480770 | 10/1974 | United Kingdom . |
| 2019960 | 4/1979 | United Kingdom . |

Primary Examiner—P. W. Echols
Attorney, Agent, or Firm—Banner, Birch, McKie & Beckett

[57] ABSTRACT

A clutch rotor for use in an electromagnetic clutch and the method for producing a clutch rotor is disclosed. The clutch rotor comprises a rotor member and a V-shaped pulley to receive a drive belt. The rotor member includes an outer cylindrical portion, an inner cylindrical portion and a circular end plate connected therebetween. The outer cylindrical member is provided with a groove which is formed on the outer surface thereof for disposing the pulley. The pulley is formed by applying a roller working operation to a cylindrical member. Simultaneously with forming the pulley, an inner annular surface of the pulley is interfitted in the groove of the rotor member thereby simplifying construction of the device.

4 Claims, 3 Drawing Sheets

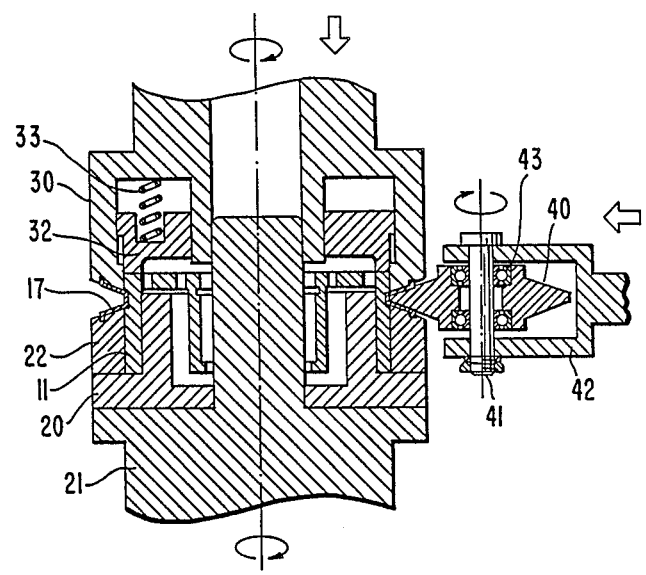
FIG. 7
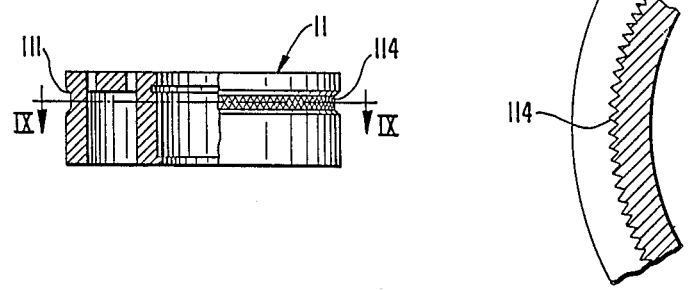
FIG. 8
FIG. 9

METHOD OF MAKING A CLUTCH ROTOR FOR AN ELECTROMAGNETIC CLUTCH

This application is a division of application Ser. No. 071,195, filed July 7, 1987, now U.S. Pat. No. 4,789,380.

TECHNICAL FIELD OF THE INVENTION

The present invention relates to a clutch rotor suitable for use in an electromagnetic clutch and a method for producing a clutch rotor.

BACKGROUND OF THE INVENTION

A conventional electromagnetic clutch includes a ring-shaped rotor driven through a belt by a driving source such as a car engine, ar armature disposed to face the end plate of the rotor with a gap therebetween and an electromagnetic coil generating an electromagnetic circuit including the rotor and the armature to attract the armature into contact with the rotor. In this way, the armature rotates together with the rotor and rotational force is transmitted from the engine to an air conditiong unit.

The above rotor is customarily pre-formed by forging, and is then finished by a turning process (this process is disclosed in Japanese Utility Model Publication No. 57-39,639). However, when a rotor is finished by a turning process, a great volume of waste material is generated. The process is also complicated and therefore expensive.

Another method for producing a rotor is disclosed in Japanese Patent Application Laid Open No. 54-14,364 which shows a ring-shaped pulley disposed on the outer peripheral surface of a rotor. The pulley is first formed in a V-shape or W-shape and then disposed on the outer surface of the rotor. Thereafter, the pulley is attached to the rotor by welding or fitting. This step of attaching the pulley to the rotor, required by the separate construction of each, is complicated and therefore reduces manufacturing performance. The cost of the equipment to perform this type of manufacturing process is high, since particular equipment is needed for the welding or fitting steps.

SUMMARY OF THE INVENTION

It is a primary object of this invention to provide a clutch rotor for an electromagnetic clutch which is easily produced.

It is another object of this invention to provide a clutch rotor for an electromagnetic clutch which can be economically produced.

The clutch rotor for an electromagnetic clutch according to this invention includes a rotor member having an outer cylindrical portion, an inner cylindrical portion, a circular end plate connected therebetween, and a V-shaped pulley for receiving a V-belt to transmit the power of a driving source. The outer cylindrical portion is provided with an annular groove formed on its outer surface. The V-shaped pulley is fixedly interfitted within this annular groove. The method for producing a clutch rotor for use in an electromagnetic clutch according to this invention includes forming a V-shaped pulley which is adapted to receive a drive belt by applying a roller working operation to a cylindrical member and simultaneously interfitting an inner surface of the V-shaped pulley within the groove of the rotor member.

Further objects, features and other aspects of this invention will be understood from the following detailed description of the preferred embodiments of this invention when read in conjunction with the annexed drwings.

BRIEF DESCRIPTION OF THE DRAWINGS

FIG. 7 is a cross-sectional view used to explain a third step for producing a clutch rotor.

FIG. 8 is a half cross-sectional view of a rotor in accordance with another embodiment of this invention.

FIG. 9 is a cross-sectional view taken along line IX—IX shown in FIG. 8.

DETAILED DESCRIPTION OF THE PREFERRED EMBODIMENTS

Figure 1:
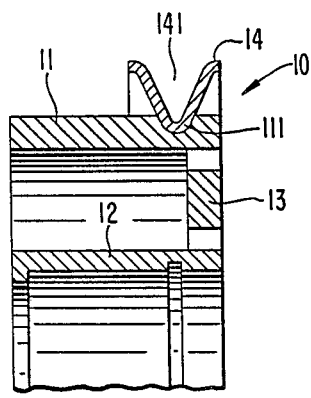
FIG. 1 is a cross-sectional view of a clutch rotor in accordance with one embodiment of this invention.

Referring to FIG. 1, a clutch rotor for an electromagnetic clutch is shown in accordance with one embodiment of this invention. Clutch rotor 10 comprises outer cylindrical portion 11, inner cylindrical portion 12, which is connected to outer cylindrical portion 11 through circular end portion 13, and V-shaped pulley 14. Outer cylindrical portion 11 is provided with groove 111 at its outer peripheral surface for disposing pulley 14. Groove 111 is formed by turning and the depth of groove 111 is constant throughout the rotor. Pulley 14 is formed with a V-shaped cross-section so as to form receiving portion 141 for a belt (not shown) and is securely disposed on groove 111. Since pulley 14 is disposed in groove 111, the axial movement of pulley 14 is prevented and pulley 14 is also prevented from rotating by the frictional force produced between the surface of pulley 14 and the surface of groove 111.

Figure 2:
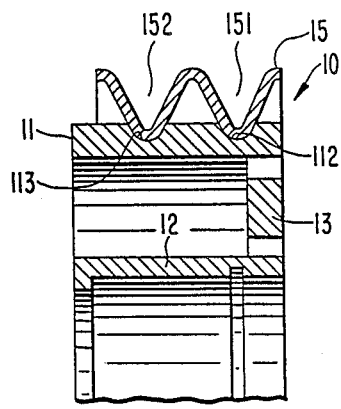
FIG. 2 is a cross-sectional view of a clutch rotor in accordance with a second embodiment of this invention.

Referring to FIG. 2, a double V-shaped pulley 15 having two receiving portions 151, 152 to receive two belts (not shown) may be fixed on rotor 10. Pulley 15 is formed with a W-shaped cross-section and is securely disposed on grooves 112 and 113.

Figure 3:
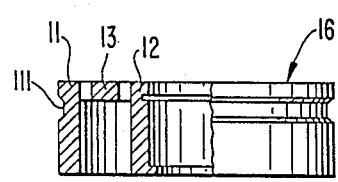
FIG. 3 is a partial cross-sectional view of the clutch rotor of FIG. 1.
Figure 4:
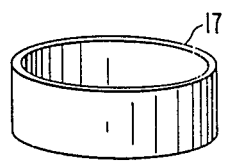
FIG. 4 is a perspective view of a cylindrical member used for making a pulley.

Referring to FIGS. 3 to 7, a method for producing a clutch rotor in accordance with one embodiment of this invention will be explained. FIG. 3 shows a rotor member 16 including outer cylindrical portion 11 and inner cylindrical portion 12 connected to outer cylindrical portion 11 through circular end portion 13. As described above, outer cylindrical portion 11 is provided with groove 111 to receive the bottom portion of a pulley. FIG. 4 shows cylindrical member 17 which is used to form the pulley as discussed below.

Figure 5:
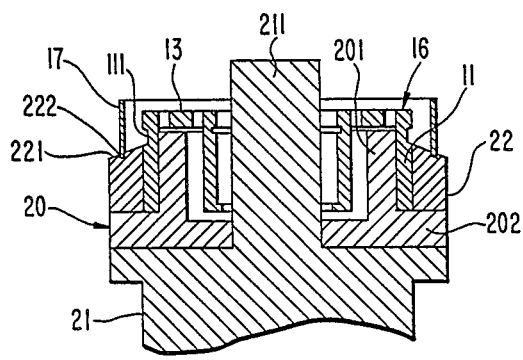
FIG. 5 is a cross-sectional view used to explain a first step for producing a clutch rotor.

Referring to FIG. 5, rotor portion 16 is placed on back up jig 20, which includes an annular projection 201 axially extending from circular end plate 202 to support rotor member 16 so that the inner surface of outer cylindrical portion 11 of rotor member 16 contacts the outer surface of projection 201 of back up jig 20. Back up jig 20 is disposed on driving axis 21 which includes projection 211. Lower jig 22 is disposed on the outer end surface of circular end plate 202 so that the inner surface of lower jig 22 contacts the outer surface of outer cylindrical portion 11. Lower jig 22 is provided with inclined surface 221 at the upper end surface thereof. Circular groove 222 is formed on inclined surface 211. One end portion of cylindrical member 17 is inserted into circular groove 222.

Figure 6:
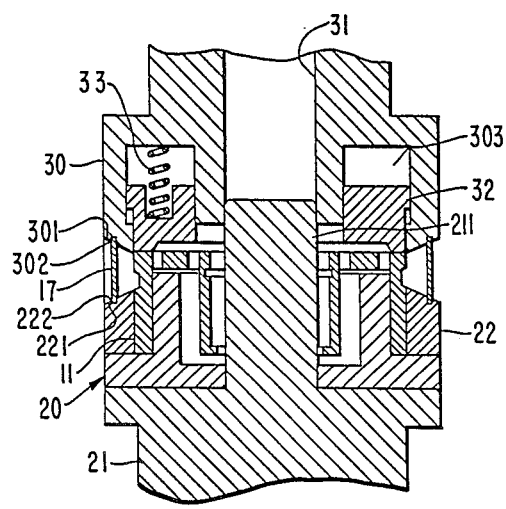
FIG. 6 is a cross-sectional view used to explain a second step for producing a clutch rotor.

Referring to FIG. 6, upper jig 30 is shown and includes guide hole 31 which encompasses projection 211 of driving axis 21. Upper jig 30 is provided with inclined surface 301 facing inclined surface 221 of lower jig 22. Circular groove 302 is formed on surface 301 at a place corresponding to circular groove 221 on inclined surface 301. The other end portion of cylindrical member 17 is inserted into circular groove 302. Stopper 32 is slidably disposed in hollow portion 303 of upper jig 30 along the inner surface of hollow portion 303 and is forced in the direction of driving axis 21 by the recoil strength of spring 33 so as to prevent rotor member 11 from moving. As mentioned above, cylindrical member 17 and rotor member 11 are securely attached. When driving axis 21 rotates, each part of the electromagnetic rotor and the manufacturing devices is rotated together.

Referring to FIG. 7, when driving axis 21 is rotated together with the other parts including rotor member 11 and cylindrical member 17, and upper jig 30 is simultaneously moved downwardly, a roller 40 is urged into contact with the outer surface of cylinder member 17. Since roller 40 is rotatably supported with pin 41 which is fixed on roller holder 42, through bearing 43, roller 40 rotates in accordance with the rotation of cylindrical member 17. The cross-sectional shape of roller 40 is the same as the outer surface of groove 111. Therefore, cylindrical member 17 is formed into the shape of a pulley including an inner surface which is defined by the outer surfaces of groove 111 and inclined surfaces 221 and 301. Simultaneously, cylindrical member 17 is fixed into groove 111 by urging roll 40 to the outer surface thereof during rotation.

For more strongly attaching the pulley to groove 111, groove 111 is made knurly at the bottom surface thereof, as shown in FIGS. 8 and 9. In another embodiment (not shown) the knurling may be formed on the bottom surface of V-shaped pulley 14. The inner bottom end surface of the pulley is interfitted on knurly surface 114 of groove 111. Therefore, the pulley and rotor member 16 will be more securely attached.

This invention has been described in detail in connection with the preferred embodiments, but these embodiments are for illustrative purposes only and the invention is not restricted thereto. It will be easily understood by those skilled in the art that other variations and modifications can be made within the scope of this invention, which is defined only by the following claims.

I claim:

1. A method of producing a clutch rotor having a rotor member and a V-shaped pulley fastened to said rotor member, said rotor member including an outer cylindrical portion, the method comprising the steps of:
   (a) forming an annular groove on the outer surface of said outer cylindrical portion of said rotor member;
   (b) bending a cylindrical plate through a roller working operation to form a V-shaped pulley having an annular base portion, said V-shaped pulley adapted to receive a drive belt; and
   (c) simultaneously with said bending, interfitting said annular base portion of said V-shaped pulley in said annular groove of said rotor member.

2. The method according to claim 1, wherein said groove is formed with knurling on a bottom surface thereof.

3. The method according to claim 1, wherein said annular base portion of said pulley is formed with knurling on a bottom surface thereof.

4. A method of producing a clutch rotor having a rotor member and a V-shaped pulley fastened to said rotor member, said rotor member including an outer cylindrical portion, the method comprising the steps of:
   (a) forming an annular groove on the outer surface of said outer cylindrical portion of said rotor member, said annular groove being formed with knurling on a bottom surface thereof;
   (b) bending a cylindrical plate through a roller working operation to form a V-shaped pulley having an annular base portion with knurling on a bottom surface thereof, said V-shaped pulley adapted to receive a drive belt; and
   (c) simultaneously with said bending, interfitting said annular base portion of said V-shaped pulley in said annular groove of said rotor member.

* * * * *